US012453486B2

(12) United States Patent
Lindholm et al.

(10) Patent No.: US 12,453,486 B2
(45) Date of Patent: Oct. 28, 2025

(54) APPARATUS, METHODS AND COMPUTER PROGRAMS FOR DETERMINING PULSE WAVE VELOCITY

(71) Applicant: Nokia Technologies Oy, Espoo (FI)

(72) Inventors: Harri Lindholm, Helsinki (FI); Tapio Taipalus, Espoo (FI)

(73) Assignee: Nokia Technologies Oy, Espoo (FI)

( * ) Notice: Subject to any disclaimer, the term of this patent is extended or adjusted under 35 U.S.C. 154(b) by 1079 days.

(21) Appl. No.: 17/269,298

(22) PCT Filed: Jul. 30, 2019

(86) PCT No.: PCT/EP2019/070408
§ 371 (c)(1),
(2) Date: Feb. 18, 2021

(87) PCT Pub. No.: WO2020/038689
PCT Pub. Date: Feb. 27, 2020

(65) Prior Publication Data
US 2021/0177285 A1    Jun. 17, 2021

(30) Foreign Application Priority Data

Aug. 22, 2018 (EP) ..................................... 18190191

(51) Int. Cl.
*A61B 5/00* (2006.01)
*A61B 5/0285* (2006.01)
*A61B 5/11* (2006.01)

(52) U.S. Cl.
CPC .......... *A61B 5/0285* (2013.01); *A61B 5/1102* (2013.01); *A61B 5/6891* (2013.01);
(Continued)

(58) Field of Classification Search
CPC ... A61B 5/0285; A61B 5/1102; A61B 5/6891; A61B 5/702; A61B 5/7278; A61B 2562/0219; A61B 2562/04; A61B 5/02007; A61B 5/02014; A61B 5/02116; A61B 5/02125; A61B 5/352; A61B 8/04; A61B 8/0891; A61B 8/5223; A61B 5/0022; A61B 8/02; A61B 8/4209; A61B 8/5207;
(Continued)

(56) References Cited

U.S. PATENT DOCUMENTS

2014/0142451 A1*   5/2014   Kim ..................... A61B 5/1171
                                                                600/526
2017/0079533 A1     3/2017   Robinson et al.
(Continued)

*Primary Examiner* — Carl H Layno
*Assistant Examiner* — Anh-Khoa N Dinh
(74) *Attorney, Agent, or Firm* — McCarter & English LLP

(57) ABSTRACT

The application relates to apparatus, methods and computer programs for determining pulse wave velocity, The apparatus includes circuitry configured for: receiving a first ballistocardiograph signal indicative of a pulse wave travelling in a first direction at a first time, the pulse wave having a pulse velocity and receiving a second ballistocardiograph signal indicative of the pulse wave travelling in a second direction at a second time, wherein the second direction is, at least partially, perpendicular to the first direction. The circuitry is also configured for determining the pulse wave velocity based one the first ballistocardiograph signal and the second ballistocardiograph signal.

15 Claims, 3 Drawing Sheets

(52) U.S. Cl.
CPC ............ *A61B 5/702* (2013.01); *A61B 5/7278* (2013.01); *A61B 2562/0219* (2013.01)

(58) Field of Classification Search
CPC ..... A61B 5/681; A61B 5/02108; A61B 8/485; A61B 8/54; A61B 2562/0247; A61B 2562/043; A61B 5/02; A61B 5/0205
See application file for complete search history.

(56) References Cited

U.S. PATENT DOCUMENTS

| | | | |
|---|---|---|---|
| 2017/0143216 A1* | 5/2017 | Oksala | A61B 5/02125 |
| 2017/0209053 A1* | 7/2017 | Pantelopoulos | A61B 5/7264 |
| 2018/0020931 A1 | 1/2018 | Shusterman | |

* cited by examiner

APPARATUS, METHODS AND COMPUTER PROGRAMS FOR DETERMINING PULSE WAVE VELOCITY

CROSS REFERENCE TO RELATED APPLICATION

This patent application is a U.S. National Stage application of International Patent Application Number PCT/EP2019/070408 filed Jul. 30, 2019, which is hereby incorporated by reference in its entirety, and claims priority to EP 18190191.9 filed Aug. 22, 2018.

TECHNOLOGICAL FIELD

Examples of the present disclosure relate to apparatus, methods and computer programs for determining pulse wave velocity. Some relate to apparatus, methods and computer programs for determining pulse wave velocity using ballistocardiograph signals.

BACKGROUND

Pulse wave velocity gives an indication of a subject's cardiovascular health. Therefore it is useful to provide apparatus, methods and computer programs for determining pulse wave velocity within a subject.

BRIEF SUMMARY

According to various, but not necessarily all, examples of the disclosure there is provided an apparatus comprising means for: receiving a first ballistocardiograph signal indicative of a pulse wave travelling in a first direction at a first time, the pulse wave having a pulse velocity; receiving a second ballistocardiograph signal indicative of the pulse wave travelling in a second direction at a second time, wherein the second direction is, at least partially, perpendicular to the first direction; determining the pulse wave velocity based one the first ballistocardiograph signal and the second ballistocardiograph signal.

The first ballistocardiograph signal may correspond to the pulse wave travelling through an aorta of a subject and the second ballistocardiograph signal may correspond to the pulse wave travelling through an iliac artery of a subject.

The first direction may be a vertical direction and the second direction may be a horizontal direction.

The pulse wave may comprise an I wave.

The distance travelled by the pulse wave between the first time and the second time may be received as an input.

The first ballistocardiograph signal and the second ballistocardiograph signal may be received from sensors comprised within a chair.

The first ballistocardiograph signal and the second ballistocardiograph signal may be received from accelerometers comprised within the seat of a chair.

According to various, but not necessarily all, examples of the disclosure there is provided a system comprising an apparatus as described above and a chair configured to enable a subject to sit with their legs, at least partially, perpendicular to their torso wherein the chair comprises one or more sensors and/or accelerometers configured to detect ballistocardiograph signals.

According to various, but not necessarily all, examples of the disclosure there is provided an apparatus comprising: processing circuitry; and memory circuitry including computer program code, the memory circuitry and the computer program code configured to, with the processing circuitry, cause the apparatus to: receive a first ballistocardiograph signal indicative of a pulse wave travelling in a first direction at a first time, the pulse wave having a pulse velocity; receive a second ballistocardiograph signal indicative of the pulse wave travelling in a second direction at a second time, wherein the second direction is, at least partially perpendicular to the first direction; determine the pulse wave velocity based on the first ballistocardiograph signal and the second ballistocardiograph.

According to various, but not necessarily all, examples of the disclosure there is provided a method comprising: receiving a first ballistocardiograph signal indicative of a pulse wave travelling in a first direction at a first time, the pulse wave having a pulse velocity; receiving a second ballistocardiograph signal indicative of the pulse wave travelling in a second direction at a second time, wherein the second direction is, at least partially perpendicular to the first direction; determining the pulse wave velocity based on the first ballistocardiograph signal and the second ballistocardiograph.

The first ballistocardiograph signal may correspond to the pulse wave travelling through an aorta of a subject and the second ballistocardiograph signal may correspond to the pulse wave travelling through a femoral artery of a subject.

According to various, but not necessarily all, examples of the disclosure there is provided a computer program comprising computer program instructions that, when executed by processing circuitry cause: receiving a first ballistocardiograph signal indicative of a pulse wave travelling in a first direction at a first time, the pulse wave having a pulse velocity; receiving a second ballistocardiograph signal indicative of the pulse wave travelling in a second direction at a second time, wherein the second direction is, at least partially perpendicular to the first direction; determining the pulse wave velocity based on the first ballistocardiograph signal and the second ballistocardiograph signal.

The first ballistocardiograph signal may correspond to the pulse wave travelling through an aorta of a subject and the second ballistocardiograph signal may correspond to the pulse wave travelling through a femoral artery of a subject.

According to various, but not necessarily all, examples of the disclosure there is provided a physical entity embodying the computer program as described above.

According to various, but not necessarily all, examples of the disclosure there is provided an apparatus comprising: a chair configured to enable a subject to sit with their legs, at least partially, perpendicular to their torso; sensing means configured to detect a first ballistocardiograph signal indicative of a pulse wave, having a pulse wave velocity, travelling in a first direction at a first time and a second ballistocardiograph signal indicative of the pulse wave travelling in a second direction at a second time, wherein the second direction is, at least partially perpendicular to the first direction.

The sensing means may be comprised in a seat of the chair.

The sensing means may comprise one or more accelerometers.

BRIEF DESCRIPTION

Some example embodiments will now be described with reference to the accompanying drawings in which.

DETAILED DESCRIPTION

Examples of the disclosure relate to apparatus, methods and computer programs for determining pulse wave velocity using ballistocardiograph signals. The apparatus 101 comprises means for receiving a first ballistocardiograph signal 211 and a second ballistocardiograph signal 215. The first ballistocardiograph signal 211 is indicative of a pulse wave, having a pulse wave velocity, travelling in a first direction at a first time and the second ballistocardiograph signal 215 is indicative of the pulse wave travelling in a second direction at a second time, wherein the second direction is, at least partially, perpendicular to the first direction. The means of the apparatus 101 are also configured for determining the pulse wave velocity based on the first ballistocardiograph signal 211 and the second ballistocardiograph signal 215.

The apparatus 101 therefore enables the pulse wave velocity within the aorta of a subject to be determined which can provide an indication of the cardiovascular health of a subject.

Figure 1:
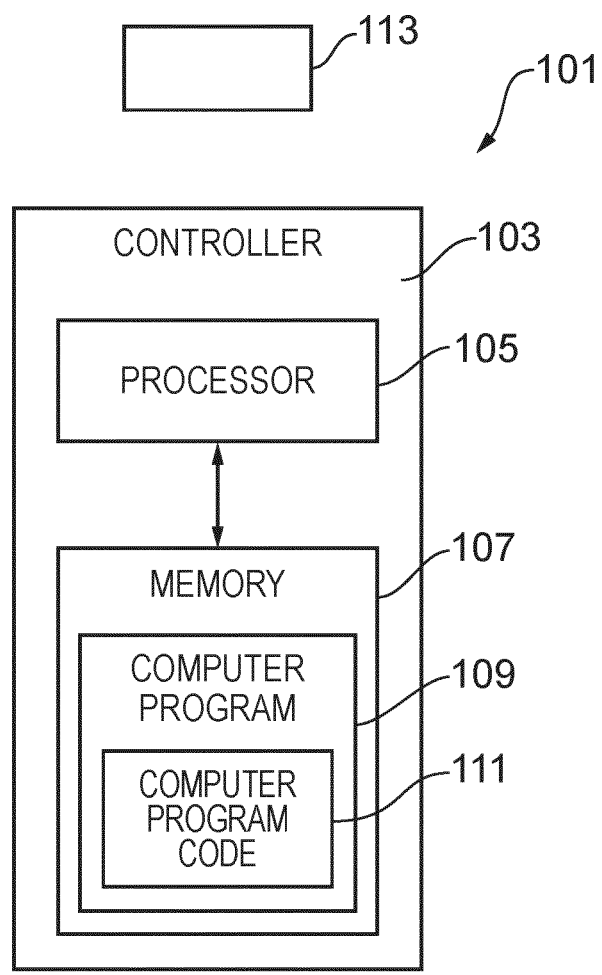
FIG. 1 illustrates an apparatus.

FIG. 1 schematically illustrates an apparatus 101 according to examples of the disclosure. The apparatus 101 illustrated in FIG. 1 may be a chip or a chip-set. In some examples the apparatus 101 may be provided within a system which is configured to measure the ballistocardiograph signals of a subject. In some examples the apparatus 101 could be located remotely to the system for measuring the ballistocardiograph signals of a subject but could be configured to receive the signals via any suitable communication link.

In the example of FIG. 1 the apparatus 101 comprises a controller 103. In the example of FIG. 1 the implementation of the controller 103 may be as controller circuitry. In some examples the controller 103 may be implemented in hardware alone, have certain aspects in software including firmware alone or can be a combination of hardware and software (including firmware).

As illustrated in FIG. 1 the controller 103 may be implemented using instructions that enable hardware functionality, for example, by using executable instructions of a computer program 109 in a general-purpose or special-purpose processor 105 that may be stored on a computer readable storage medium (disk, memory etc.) to be executed by such a processor 105.

The processor 105 is configured to read from and write to the memory 107. The processor 105 may also comprise an output interface via which data and/or commands are output by the processor 105 and an input interface via which data and/or commands are input to the processor 105.

The memory 107 is configured to store a computer program 109 comprising computer program instructions (computer program code 111) that controls the operation of the apparatus 101 when loaded into the processor 105. The computer program instructions, of the computer program 109, provide the logic and routines that enables the apparatus 101 to perform the methods illustrated in FIG. 4. The processor 105 by reading the memory 107 is able to load and execute the computer program 109.

The apparatus 101 therefore comprises: at least one processor 105; and at least one memory 107 including computer program code 111, the at least one memory 107 and the computer program code 111 configured to, with the at least one processor 105, cause the apparatus 101 at least to perform: receiving a first ballistocardiograph signal 211 indicative of a pulse wave travelling in a first direction at a first time, the pulse wave having a pulse velocity; receiving a second ballistocardiograph signal 215 indicative of the pulse wave travelling in a second direction at a second time, wherein the second direction is, at least partially perpendicular to the first direction; determining the pulse wave velocity based on the first ballistocardiograph signal 211 and the second ballistocardiograph signal 215.

As illustrated in FIG. 1 the computer program 109 may arrive at the apparatus 101 via any suitable delivery mechanism 113. The delivery mechanism 113 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 109. The delivery mechanism may be a signal configured to reliably transfer the computer program 109. The apparatus 101 may propagate or transmit the computer program 109 as a computer data signal. In some examples the computer program 109 may be transmitted to the apparatus 101 using a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol.

The computer program 109 comprises computer program instructions for causing an apparatus 101 to perform at least the following: receiving a first ballistocardiograph signal 211 indicative of a pulse wave travelling in a first direction at a first time the pulse wave having a pulse velocity; receiving a second ballistocardiograph signal 215 indicative of the pulse wave travelling in a second direction at a second time, wherein the second direction is, at least partially perpendicular to the first direction; determining the pulse wave velocity based on the first ballistocardiograph signal 211 and the second ballistocardiograph signal 215.

The computer program instructions may be comprised in a computer program 109, a non-transitory computer readable medium, a computer program product, a machine readable medium. In some but not necessarily all examples, the computer program instructions may be distributed over more than one computer program 109.

Although the memory 107 is illustrated as a single component/circuitry it may be implemented as one or more separate components/circuitry some or all of which may be integrated/removable and/or may provide permanent/semi-permanent/dynamic/cached storage.

Although the processor 105 is illustrated as a single component/circuitry it may be implemented as one or more separate components/circuitry some or all of which may be integrated/removable. The processor 105 may be a single core or multi-core processor.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" may refer to one or more or all of the following:
(a) hardware-only circuitry implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 2:
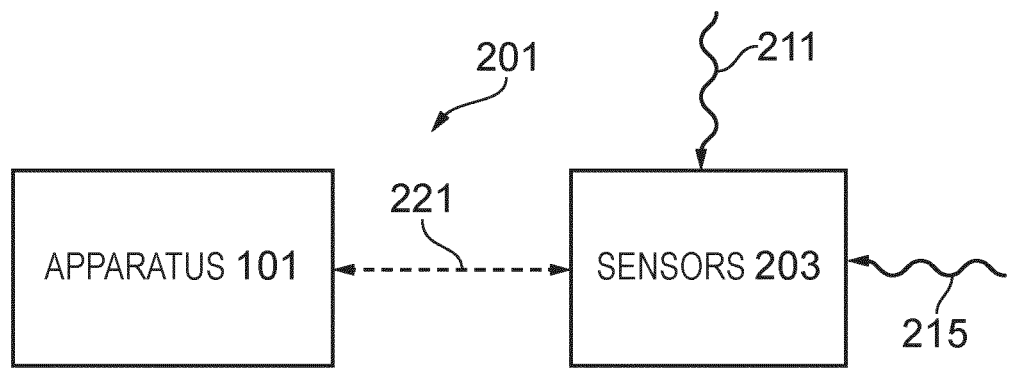
FIG. 2 illustrates a system comprising an apparatus and one or more sensors.

FIG. 2 illustrates an example system 201 comprising an apparatus 101 and one or more sensors 203. A communication link 221 is provided between the apparatus 101 and the one or more sensors 203. The system 201 is configured to enable a first ballistocardiograph signal 211 and a second ballistocardiograph signal 215 to be obtained and used to determine the pulse wave velocity of a subject.

The apparatus 101 could be an apparatus 101 as shown in FIG. 1. The apparatus 101 could comprise a controller 103, processor 105 and memory 107 as described.

The apparatus 101 could be configured to establish a communication link 221 with the one or more sensors 203 so as to enable information obtained by the one or more sensors 203 to be provided to the apparatus 101. The communication link 221 could also enable control signals, and/or any other suitable information, to be transmitted from the apparatus 101 to the one or more sensors 203.

In some examples the communication link 221 could comprise a wireless communication link which uses a wireless protocol such as Bluetooth, Bluetooth Low Energy, Bluetooth Smart, 6LoWPan (IP$_v$6 over low power personal area networks) ZigBee, ANT+, near field communication (NFC), Radio frequency identification, wireless local area network (wireless LAN) or any other suitable protocol. In some examples the communication link 221 could comprise a wired connection or any other suitable type of connection.

The one or more sensors 203 may comprise any means which enables ballistocardiograph signals 211, 215 to be detected from a subject. The one or more sensors 203 are configured to detect the ballistic force of the pulse of the subject. The one or more sensors 203 may be configured to detect the ballistic force of the pulse as it travels through the aorta and iliac artery of a subject. The one or more sensors 203 could comprise accelerometers, force sensors, or any other suitable means or combination of such means.

The one or more sensors 203 are configured within the system 201 so as to enable a first ballistocardiograph signal 211 to be detected at a first time and a second ballistocardiograph signal 215 to be detected at a second time. The second time may be after the first time.

The one or more sensors 203 are configured within the system 201 so as to enable ballistocardiograph signals 211, 215 travelling in different directions to be detected. In examples of the disclosure the first ballistocardiograph signal 211 is indicative of a pulse wave travelling in a first direction and the second ballistocardiograph signal 215 is indicative of a pulse wave travelling in a second direction. The first and second direction could be perpendicular, or at least partially perpendicular to each other. The first ballistocardiograph signal 211 could be caused by the pulse travelling through a first artery while the second ballistocardiograph signal could be caused by the pulse travelling through a second artery. The subject could be positioned so that the first and second artery extend in different directions. For example, the first artery could be the aorta while the second artery could be the iliac artery and the subject could be arranged in a seated position so that the iliac artery extends in a different direction to the aorta.

In some examples the same sensor 203 could be configured to detect the ballistocardiograph signals 211, 215 representing the pulse wave travelling in different directions. This may enable the system 201 to be operable with a single sensor 203. For instance an accelerometer may be configured to detect forces in different directions.

In other examples the system 201 could comprise a plurality of sensors 203 where different sensors 203 are configured to detect the different ballistocardiograph signals 211, 215. For example, a first force sensor 203 could be positioned to detect the first ballistocardiograph signal 211 and a second force sensor 203 could be positioned to detect the second ballistocardiograph signal 215.

In some but not necessarily all examples, the one or more sensors 203 may be configured to communicate data from the one or more sensors 203 with or without local storage of the data in a memory at one or more sensors 203 and with or without local processing of the data by circuitry or processors at the one or more sensors 203.

The data may, for example, be measurement data from the one or more sensors 203 or data produced by the processing of measurement data from one or more sensors 203, such as, for example, an indication of the times at which the ballistocardiograph signals 211, 215 were detected.

The data may be stored in processed or unprocessed format remotely at one or more devices. In some examples the data may be stored on a remote server.

The data may be processed remotely by one or more apparatus 101 which may be provided in one or more devices. The data may be partially processed locally and partially processed remotely by the one or more apparatus 101 in one or more devices.

The data may be communicated to the apparatus 101 in the one or more remote devices wirelessly via short range radio communications such as Wi-Fi or Bluetooth, for example, or over long range cellular radio links. The one or more sensors 203 may be coupled to a communications interface such as, for example, a radio transceiver for communication of data.

The system 201 may be part of a larger, distributed network such as the Internet of Things. The Internet of Things may comprise a plurality of devices that may be configured to communicate via the internet. The devices may or may not be local to each other.

The processing of the data, whether local or remote, may be for the purpose of health monitoring, data aggregation, patient monitoring, vital signs monitoring or other purposes.

Figure 3:
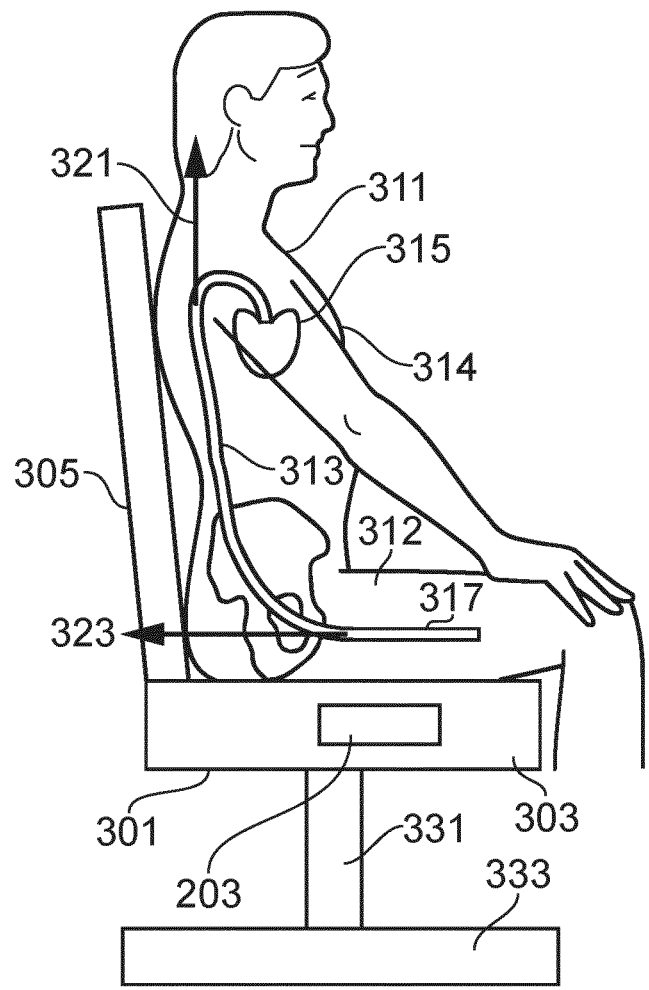
FIG. 3 illustrates a chair comprising one or more sensors.

FIG. 3 illustrates a chair 301 comprising one or more sensors 203 which may be used in some examples of the disclosure to enable the ballistocardiograph signals 211, 215 to be detected. In the example of FIG. 3 a subject 311 is sitting in the chair 301.

The chair 301 is configured to enable a subject 311 to sit with their legs 312, at least partially perpendicular to their torso 314. The seated position may enable a first artery to be positioned to extend in a different direction to a second artery. In the examples shown in FIG. 3 the subject's aorta 313 extends from the subject's heart 315 in a vertical direction while the subject's iliac artery 317 in the top of the legs 312 extends in a horizontal direction.

In the example of FIG. 3 the chair 301 comprises a seat portion 303 and a back rest 305. The seat portion 303 is configured to provide a horizontal or substantially horizontal surface for the subject 311 to sit on. The seat portion 303 may be a rigid portion so that the ballistocardiograph signals 211, 215 do not cause deformation of the seat portion 303. This may enable the ballistocardiograph signals 211, 215 to be detected.

The back rest 305 comprises a portion that is, at least partially, perpendicular to the seat portion 303. The back rest 305 is configured to support the back of the subject 311 when the subject 311 is seated on the seat portion 303. The back rest 305 may enable the subject 311 to sit in an upright position for the duration of time that the ballistocardiograph signals 211, 215 are to be measured.

The sensors 203 provide sensing means for detecting the ballistocardiograph signals 211, 215. The sensors 203 are configured to detect a first ballistocardiograph signal 211 indicative of a pulse wave travelling in a first direction 321 at a first time and a second ballistocardiograph signal 215 indicative of the pulse wave travelling in a second direction 323 at a second time, wherein the second direction 323 is, at least partially perpendicular to the first direction 321.

In the example chair 301 shown in FIG. 3 the sensors 203 are provided in the seat portion 303 of the chair 301. The same sensors 203 may be configured to detect both the first ballistocardiograph signal 211 and the second ballistocardiograph signal 215.

The sensor 203 may be provided close to the surface of the seat portion to enable the ballistocardiograph signals 211, 215 to be detected. In the example of FIG. 3 a single sensor 203 is provided which is configured to detect ballistocardiograph signals in the first direction and also the second direction. The sensor 203 could comprise one or more accelerometers or any other suitable means.

In the example of FIG. 3 the seat portion 303 of the chair 301 is mounted on a spring 331 which is coupled to a rigid base portion 333. The spring 331 extends perpendicularly, or substantially perpendicularly, to the seat portion 303. The spring may provide means for enabling movement of the seat portion 303 so that the sensor 203 can detect the movement. In some examples the spring 331 may also act to damp external vibrations and so may reduce noise in the signals provided by the one or more sensors 203. Other means for enabling movement of the seat portion 303 could be used in other examples of the disclosure.

In the example system 201 of FIG. 3 the first ballistocardiograph signal 211 corresponds to the pulse wave travelling through the aorta 313 of the subject 311 and the second ballistocardiograph signal 215 corresponds to the pulse wave travelling through an iliac artery 317 of the subject 311. The forces that are detected by the sensors 203 may comprise recoil forces related to the pulse waves. In this example the first direction 321 is a vertical direction as indicated by the vertical arrow in FIG. 3 and the second direction 323 is a horizontal direction as indicated by the horizontal arrow in FIG. 3. In other examples the directions could be substantially vertical and substantially horizontal. In other examples the directions do not need to be aligned with the vertical and horizontal.

In examples of the disclosure, the change in the direction of the pulse wave can be detected by the one or more sensors 203. This gives an indication of the time at which the same pulse wave is at two different points within the arterial system of the subject 311. In examples of the disclosure the distance between these two points can be determined by making an external measurement of the subject 311. For instance a tape measure can be used to measure the length of the subject's aorta 313 or any other suitable distance. In such cases the apparatus 101 would receive an input indicative of the distance travelled by the pulse wave. The pulse wave velocity can be determined from the time it takes the pulse to travel between the two different points of the arterial system.

The same type of wave could be detected at the different points within the arterial system. In examples of the disclosure the pulse wave that is detected by the sensors 203 could comprise an I wave. The I wave may be the largest component of the pulse wave within the arteries. Other components of the pulse wave could be detected in other examples of the disclosure.

In the example of FIG. 3 the sensors 203 are provided in the seat of the chair 301. The sensors 203 could comprise an accelerometer or any other suitable means which may be configured to detect the ballistocardiograph signals 211, 215 in at least two different directions. In other examples the sensors 203 could be provided in different positions so as to enable the different ballistocardiograph signals 211, 215 to be detected. For instance a first force sensor could be provided in the seat portion 303 of the chair 301 to detect the first ballistocardiograph signal 211 and a second force sensor could be provide in the back rest 305 of the chair 301 so as to detect the second ballistocardiograph signal 215. Other configurations of the sensors 203 could be used in other examples of the disclosure.

Figure 4:
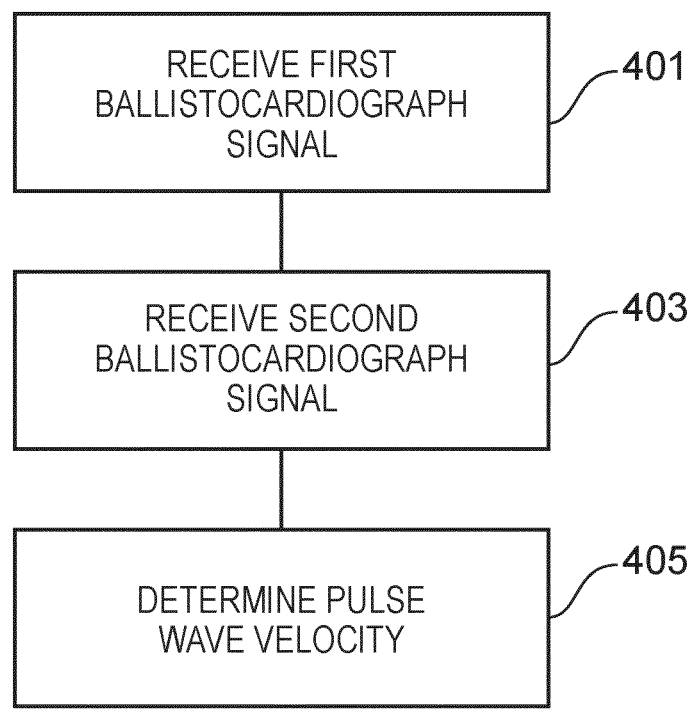
FIG. 4 illustrates a method.

FIG. 4 illustrates a method that could be implemented using the apparatus 101, systems 201 and chairs 301 described above.

The method comprises, at block 401, receiving a first ballistocardiograph signal 211 indicative of a pulse wave travelling in a first direction 321 at a first time, the pulse wave having a pulse wave velocity. In examples of the disclosure the first ballistocardiograph signal 211 could be a pulse wave travelling through the aorta 313 of a subject 311. The pulse wave could be travelling in a vertical or substantially vertical direction.

The method also comprises, at block 403, receiving a second ballistocardiograph signal 215 indicative of the pulse wave travelling in a second direction 323 at a second time, wherein the second direction 323 is, at least partially perpendicular to the first direction 321. In examples of the disclosure the second ballistocardiograph signal 215 could be a pulse wave travelling through the iliac artery of the subject 311. The pulse wave could be travelling in a horizontal or substantially horizontal direction.

The method also comprises, at block 405, determining the pulse wave velocity based on the first ballistocardiograph signal 211 and the second ballistocardiograph signal 215. The pulse wave velocity can be determined from the time it takes the pulse wave to travel between the aorta 313 and the iliac artery 317 or any other suitable points in the arterial system.

In some examples the method could also comprise blocks that are not shown in FIG. 4. For example in some examples the received ballistocardiograph signals 211, 215 could be processed to remove noise and/or artefacts. For example the received ballistocardiograph signals 211, 215 could be filtered to remove artefacts caused by the subject 311 breathing.

In some examples the received ballistocardiograph signals 211, 215 could also be processed to remove artefacts caused by motion of the user. In some examples the motion artifacts caused by the motion of the subject 311 could be limited by the subject keeping still for the duration of the ballistocardiograph measurements.

The technical effects of examples of the disclosure are therefore an effective and accurate system and process for determining the pulse wave velocity of a subject 311. The system 201 and method are non-invasive and do not require any electrodes or direct electrical connections to the skin of the subject 311. The measurements can be made while the subject 311 is seated in a chair 301 and so may be a convenient and non-intrusive method of making the measurements.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to 'comprising only one . . . ' or by using 'consisting'.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   at least one processor; and
   at least one memory storing instructions, that when executed by the at least one processor, cause the apparatus at least to:
   receive from one or more sensors associated with a subject sitting in a chair, signals comprising a first ballistocardiograph signal and a second ballistocardiograph signal of an arterial system of the subject, wherein the signals are indicative of a pulse wave having a pulse velocity that is travelling in a first direction at a first time and in a second direction at a second time, and wherein the second direction is, at least in part, perpendicular to the first direction;

process the first ballistocardiograph signal and the second ballistocardiograph signal to remove artefacts and noise created by motion of the subject; and determine the pulse wave velocity based on a processed at least one of the first ballistocardiograph signal and the second ballistocardiograph signal.

2. The apparatus as claimed in claim 1 wherein the first ballistocardiograph signal corresponds to the pulse wave travelling through an aorta of the subject and the second ballistocardiograph signal corresponds to the pulse wave travelling through an iliac artery of the subject.

3. The apparatus as claimed in claim 1 wherein the first direction is a vertical direction and the second direction is a horizontal direction.

4. The apparatus as claimed in claim 1 wherein the pulse wave comprises an I wave.

5. The apparatus as claimed in claim 1 wherein the distance travelled by the pulse wave between the first time and the second time is received as an input.

6. The apparatus as claimed in claim 1 wherein the first ballistocardiograph signal and the second ballistocardiograph signal are received from the one or more sensors comprised within the chair.

7. The apparatus as claimed in claim 6, wherein the at least one processor; and at least one memory is storing instructions, that when executed by the at least one processor, cause the apparatus at least to:

use the chair configured to enable the subject to sit with their legs at least in part perpendicular to their torso, wherein the chair comprises at least one of the one or more sensors or one or more accelerometers configured to detect ballistocardiograph signals.

8. The apparatus as claimed in claim 1 wherein the first ballistocardiograph signal and the second ballistocardiograph signal are received from accelerometers comprised within the seat of the chair.

9. A method comprising:

receiving from one or more sensors associated with a subject sitting in a chair, signals comprising a first ballistocardiograph signal and a second ballistocardiograph signal, wherein the signals are indicative of a pulse wave having a pulse velocity travelling in a first direction at a first time and in a second direction at a second time;

and wherein the second direction is, at least in part, perpendicular to the first direction;

processing the first ballistocardiograph signal and the second ballistocardiograph signal to remove artefacts and noise created by motion of the subject; and determining the pulse wave velocity based on a processed at least one of the first ballistocardiograph signal and the second ballistocardiograph.

10. The method as claimed in claim 9 wherein the first ballistocardiograph signal corresponds to the pulse wave travelling through an aorta of the subject and the second ballistocardiograph signal corresponds to the pulse wave travelling through a femoral artery of the subject.

11. A computer program comprising computer program instructions stored on a non-transitory medium that, when executed by processing circuitry cause:

receiving from one or more sensors associated with a subject sitting in a chair, signals comprising a first ballistocardiograph signal and a second ballistocardiograph signal of an arterial system of the subject, wherein the signals are indicative of a pulse wave having a pulse velocity travelling in a first direction at a first time and in a second direction at a second time;

wherein the second direction is, at least in part, perpendicular to the first direction;

processing the first ballistocardiograph signal and the second ballistocardiograph signal to remove artefacts and noise created by motion of the subject; and determining the pulse wave velocity based on a processed at least one of the first ballistocardiograph signal and the second ballistocardiograph signal.

12. The computer program as claimed in claim 11 wherein the first ballistocardiograph signal corresponds to the pulse wave travelling through an aorta of the subject and the second ballistocardiograph signal corresponds to the pulse wave travelling through a femoral artery of the subject.

13. An apparatus comprising:

at least one processor; and at least one memory storing instructions, that when executed by the at least one processor, cause the apparatus at least to:

use a chair configured to enable a subject to sit with their legs at least in part perpendicular to their torso; and detect from one or more sensors associated with a subject sitting in a chair, signals comprising a first ballistocardiograph signal and a second ballistocardiograph signal of an arterial system of the subject sitting in a chair received from the one or more sensors and indicative of a pulse wave indicative of a pulse wave velocity, travelling in a first direction at a first time and a second direction at a second time, wherein the second direction is, at least partially perpendicular to the first direction, and wherein the first ballistocardiograph signal and the second ballistocardiograph signal are processed to remove artefacts and noise created by motion of the subject.

14. The apparatus as claimed in claim 13 wherein the apparatus is comprised in a seat of the chair.

15. The apparatus as claimed in claim 13 wherein the apparatus comprises one or more accelerometers.

* * * * *